United States Patent
Peschke

(10) Patent No.: US 6,703,810 B2
(45) Date of Patent: Mar. 9, 2004

(54) DIGITAL CONTROLLED CHARGE CURRENT REGULATOR

(75) Inventor: Carlo Peschke, Kirchheim/Teck (DE)

(73) Assignee: Dialog Semiconductor GmbH, Kirchheim/Teck-Nabern ( * ) Notice: Subject to any disclaimer, the term of this patent is extended or adjusted under 35 U.S.C. 154(b) by 0 days.

(21) Appl. No.: 10/279,899

(22) Filed: Oct. 24, 2002

(65) Prior Publication Data

US 2004/0021444 A1 Feb. 5, 2004

(30) Foreign Application Priority Data

Aug. 2, 2002 (EP) .......................... 02392014

(51) Int. Cl.⁷ ............................................... H01M 1/40
(52) U.S. Cl. ...................................................... 320/128
(58) Field of Search ................................. 320/104, 121, 320/122, 127, 128, 135, 136, 140; 323/283, 285, 288, 351

(56) References Cited

U.S. PATENT DOCUMENTS

| 3,754,182 | A |   | 8/1973  | Morris et al. ............... 323/17 |
| 3,970,919 | A |   | 7/1976  | Butcher ...................... 323/19 |
| 4,109,194 | A |   | 8/1978  | Miller ........................ 323/17 |
| 5,969,515 | A | * | 10/1999 | Oglesbee .................... 323/283 |
| 6,177,787 | B1 | * | 1/2001  | Hobrecht .................... 323/283 |

FOREIGN PATENT DOCUMENTS

| JP | 59-097218 A   | 6/1984  | ......... H03H/17/02 |
| JP | 62 136120 A   | 6/1987  | ......... H03H/17/02 |
| WO | WO 01/33310 A1| 10/2001 | ............. G05F/1/40 |

* cited by examiner

Primary Examiner—Edward H. Tso
(74) Attorney, Agent, or Firm—George O. Saile; Stephen B. Ackerman

(57) ABSTRACT

A method for regulating the battery charge current with improved loop stability is achieved. Key element of this invention is a digital low pass filter within the feedback loop of the regulator, which is built by an up/down counter, a digital-to-analog-converter and a variable frequency oscillator. To achieve regulating loop stability in state-of-the-art analog designs, the dominant pole has to be selected at a sufficiently low frequency, which causes the regulator to be too slow for pulsed charge currents. The disclosed invention replaces the analog feedback circuit with a digital low pass filter arrangement. It achieves stability by being able to choose the low pass filter time constant longer than the supply-voltage-pulse-width with reduced circuit complexity and less electronic circuit resources. Furthermore, the timing characteristics can be varied during normal operation by modifying the oscillator frequency and by presetting the up/down counter to defined values. The circuit is capable of regulating a charge current from a pulsed power supply, such as a rectified sine wave power supply without capacitor and can provide a pulse-width-modulated charge current. The circuit makes sure that the maximum peak current of the battery isn't exceeded by sampling only when there is sufficient supply voltage.

44 Claims, 2 Drawing Sheets

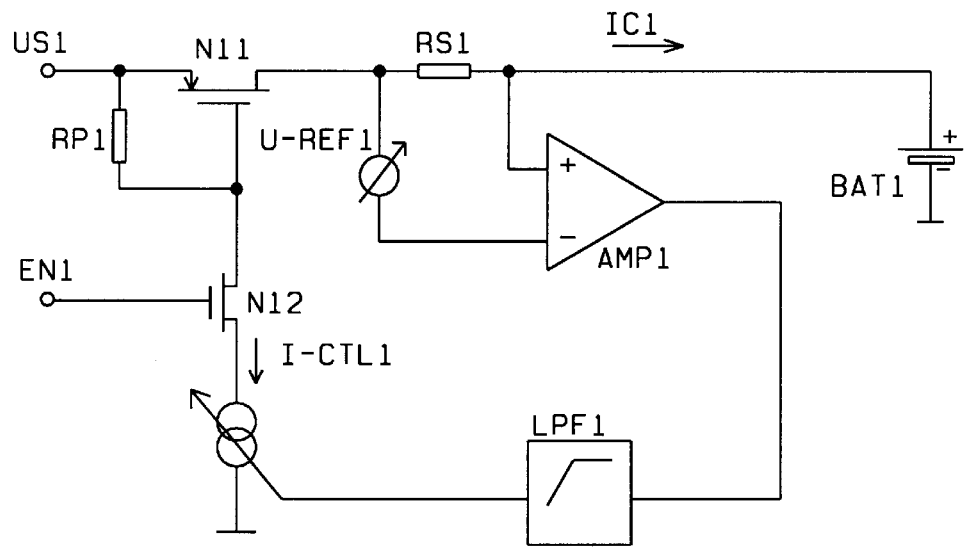
FIG. 1 – Prior Art
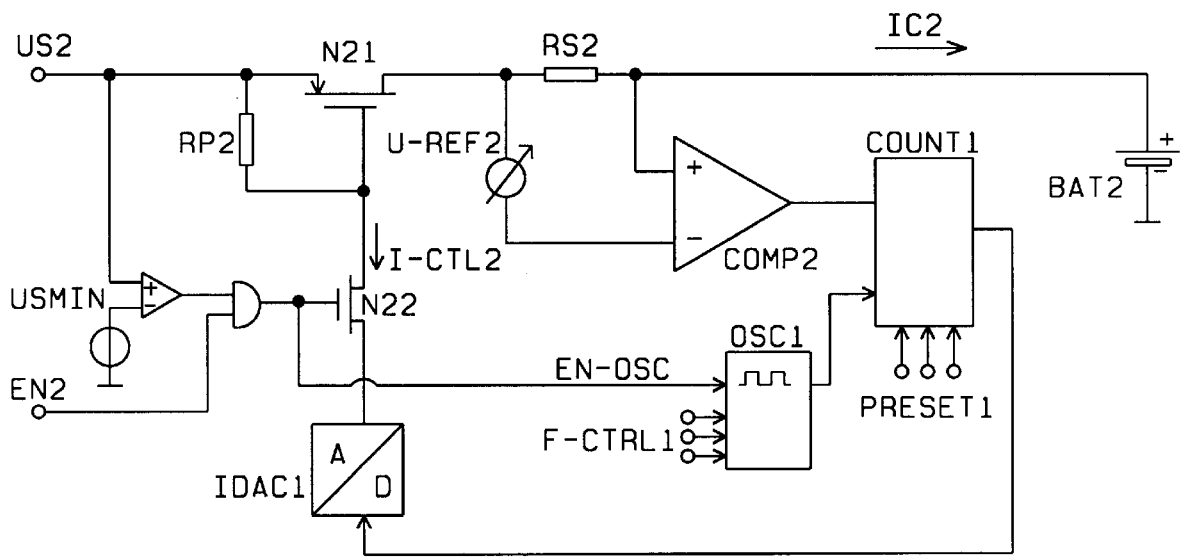
FIG. 2

DIGITAL CONTROLLED CHARGE CURRENT REGULATOR

BACKGROUND OF THE INVENTION

(1) Field of the Invention

The invention relates to a regulated battery charge current circuit, and more particularly, to a regulated charge current circuit having a digitally controlled low-pass-filter within the feedback loop for optimized loop stability and simple adjustment.

(2) Description of the Prior Art

Regulated charge current circuits use an analog low pass filter in their feedback loop, which require certain precautions to achieve sufficient stability. With state-of-the-Art designs, the feedback loop is typically realized by an analog amplifier followed by an analog integrator.

In order to get stable operation, the dominant pole of the regulator function needs to be selected at a very low frequency. The disadvantage of a low dominant pole is that the regulator becomes slow. This is a problem if the charge current is switched on and off at a higher frequency than this dominant pole (e.g. in case of a pulsed charge current or a rectified sine wave power supply). Then the regulator won't be able to reach the stable state within one pulse and the charge current will be too low. Further, the problem with this type of design is that the capacitors have to be very large.

FIG. 1 shows a typical state-of-the-art charge current regulator circuit design. The transistor N11, connected to the supply source US1 and operating as a current valve, feeds the charge current IC1 to the battery BAT1. Said charge current IC1 produces a drop voltage across the shunt resistor RS1. A voltage reference U-REF1, which is equivalent to the desired charge current, multiplied by the shunt resistor RS1, represents the current reference. The amplifier AMP1 typically has a well-defined gain and amplifies the voltage difference across said shunt resistor RS1 and the voltage reference U-REF1. Its output voltage is integrated by the following low pass filter LPF1. When said charge current is below the desired value, said analog low-pass filter LPF1, will ramp up to increase the control current I-CTL1, which will then further open said current valve N11. When said charge current is above the desired value, said analog low-pass filter LPF1 will then ramp down to decrease the control current I-CTL1, which will then begin to close said current valve N11. Transistor N12 works to enable or disable the battery charging process.

As stated before, state-of-the-art regulated charge current circuits typically use an analog low pass filter in their feedback loop, which require certain precautions to achieve sufficient stability. Said feedback loop could also be realized by an analog sample-and-hold-circuit followed by an analog integrator; in this case the comparator would have to be an amplifier with a fixed gain. The problem is that the capacitor in the low-pass filter would have to be very large due to leakage currents.

Several patents describe circuits for charge current regulators.

U.S. Pat. No. 6,177,787 (to Stephen W. Hobrecht) discloses circuits and methods for controlling timing and slope compensation in switching regulators. These circuits and methods include a timing control circuit that controls the timing of the switching of one or more switching regulator output stages so that the switching occurs at evenly spaced time intervals, and a slope compensation circuit that produces a slope compensation signal having a waveform that need not match the waveform of any oscillator signal, nor that need have the same period as the oscillator signal. Slope compensation is provided by generating a slope compensation signal using decoding logic, a digital-to-analog converter (DAC), and an integrator.

U.S. Pat. No. 5,969,515 (to John W. Oglesbee) describes a digital control circuit used for controlling the load current of a power converter circuit, and comprising a reference circuit, analog comparator circuit, control logic circuit, and a counter circuit. The control logic circuit controls the operation of a power switch, and uses counters in conjunction with the analog comparator circuit and reference circuit, to determine when to open and close the power switch. The load current is allowed to vary between a first and second preselected load current level.

SUMMARY OF THE INVENTION

A principal objective of the invention is to achieve improved loop stability for a charge current regulator, especially in the environment of pulsed supply voltage. This is done by replacing the analog feedback circuit with its inherent functional tolerances with a more precise digital feedback circuit. In addition, it should be possible to change the circuit's timing characteristics in a wide range during the circuit's normal operation.

Another major objective is to regulate a charge current from a pulsed power supply, such as a rectified sine wave power supply without a large filter capacitor. An additional objective for this regulator is to provide a pulse-width-modulated charge current.

One key objective is the capability to freeze the regulator state while the regulator is temporarily disabled, e.g. when the supply voltage is too low, and then to resume with no recovery time with the last defined regulator value.

A further objective is to start the circuit operation with an always well-defined circuit state.

A further objective is to reduce the chip area required, compared to an analog circuit, requiring large capacitances.

In accordance with the objectives of this invention, a circuit to achieve improved loop stability for a charge current regulator, especially in the environment of pulsed current sources, is achieved. The circuit comprises a device to regulate a charge current, operating as an electric current valve, a shunt resistor, where the charge current produces a voltage proportional to said charge current and an adjustable reference voltage source, which represents the desired charge current. The circuit also contains a comparator circuit to compare said voltages across said shunt resistor and said reference voltage.

Key element of this invention is a digital low pass filter within the feedback loop, formed by an up/down counter, a variable frequency oscillator and a digital-to-analog-converter. For this purpose the circuit provides an up/down counter, counting up or down depending on said comparator's result. Said up/down counter can be preset to a variety of specific digital values. Further the circuit provides a variable frequency oscillator to step said up/down counter in a regular time interval. Said oscillator can be set to a variety of frequency values and the circuit's control logic can enable/disable said oscillator. Furthermore the circuit contains a digital-to-analog-converter, producing an output signal proportional to the up/down counter's digital value. Said digital-to-analog-converter's output signal will then regulate said current regulating device. The circuit's control logic can enable/disable said current regulating element for the purpose of a pulse-width-modulated (PWM) charge current. When it is disabled (due to a too low input voltage or when signal EN2=low) the regulation loop is suspended and the state of the up/down counter will be stored until the element is enabled again. Therefore the regulation of the charge current will only take place as long as it is switched on. That's why the duty cycle of the pulse-width-modulated battery charge current, controlled by the control signal EN2, will not affect the regulation loop even if the regulator is much slower than the frequency of the PWM signal.

As said before, the key element of this invention, to achieve the objectives, is the digital low pass filter, built by the up/down counter, the digital-to-analog-converter and the variable frequency oscillator. The timing characteristics of such circuit are significantly different from state of the art analog solutions, thus avoiding many of the problems of state-of-the-art solutions. Furthermore, the circuit is capable of regulating a charge current from a pulsed power supply, such as a rectified sine wave power supply without a large filter capacitor and can provide a pulse-width-modulated charge current.

One key feature is the capability to freeze the regulator state while the regulator is temporarily disabled, e.g. when the supply voltage is too low, and then to resume with no recovery time with the last defined regulator value. The circuit also allows to switch the battery charging current off, when the supply voltage is below a specified minimum, switch said battery-charging current on, when the supply voltage passes said specified minimum and resume regulation at the previously saved value.

Furthermore the regulator according to this invention can provide a pulse-width-modulated battery charge current, controlled by an external pulsed control signal, while it maintains stable current regulating characteristics. While the battery charge current is switched on, said digital controlled charge current regulator performs its normal regulating function. While the battery charge current is switched off, said digital controlled charge current regulator is halted: it freezes said up/down counter, thus keeping the last digital counter value. When said battery charge current is switched on again, the regulator resumes said up/down counter operation and the battery charge current resumes at the last saved value, without requiring any extra recovery time.

BRIEF DESCRIPTION OF THE DRAWINGS

In the accompanying drawings, forming a material part of this description, there is shown:

FIG. 1 (prior art) is a circuit block diagram, showing a prior art implementation.

FIG. 2 shows a circuit block diagram in accordance with the embodiment of the invention.

DESCRIPTION OF THE PREFERRED EMBODIMENTS

Figure 3:
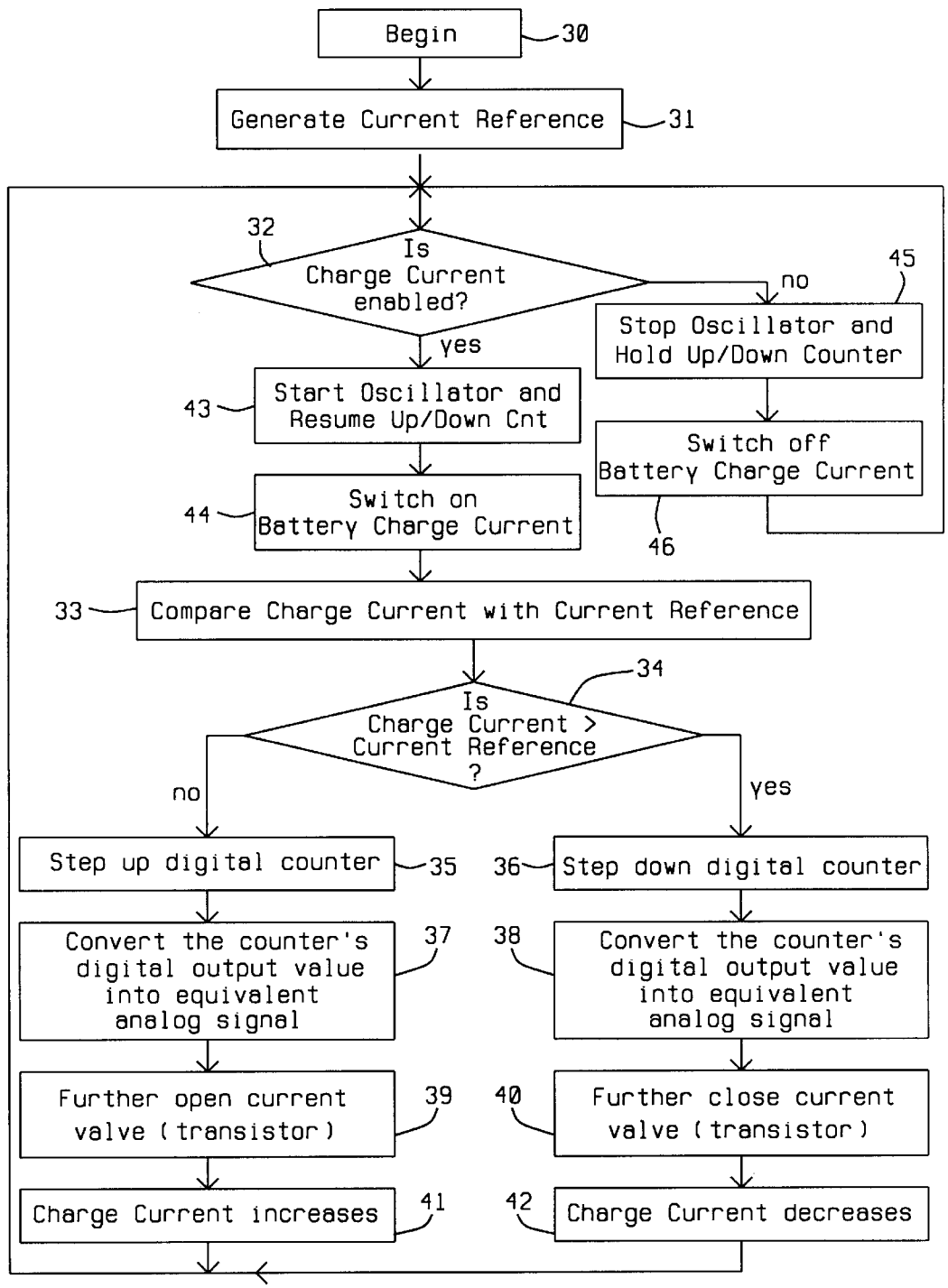
FIG. 3 shows the methods to regulate the charge current, using the digital low pass filter in the feedback loop, as a flow chart.

According to the objectives of the invention, to achieve improved loop stability for a charge current regulator, especially in the environment of pulsed current sources and to easily change the timing characteristics during the circuit's normal operation, the analog feedback loop, comprising an analog low pass filter, is replaced by a digital solution, built by an up/down counter, a digital-to-analog-converter and a variable frequency oscillator.

FIG. 2 shows a principal circuit schematic as disclosed in this invention. To overcome the described stability problems and to gain improved capabilities to adjust the timing characteristics, said analog low-pass filter is replaced by the up/down counter COUNT1, the digital-to-analog-converter IDAC1 and the variable frequency oscillator OSC1. Similar to the situation in FIG. 1, the transistor N21, connected to the supply source US2 and operating as a current valve, feeds the charge current IC2 to the battery BAT2. Said charge current IC2 produces a drop voltage across the shunt resistor RS2. A voltage reference U-REF2, which is equivalent to the desired charge current, multiplied by the shunt resistor RS1, represents the current reference. The comparator COMP2 then compares both voltages and signals whether the charge current IC2 is above or below the desired value. When said charge current is below the desired value, said up/down counter COUNT1 will step up and the following digital-to-analog-converter IDAC1 will then ramp up to increase the control current I-CTL2, which will then further open said current valve N21. When said charge current is above the desired value, said comparator switches and said up/down counter COUNT1 will step down and the following digital-to-analog-converter IDAC1 will then ramp down to decrease the control current I-CTL1, which will then begin to close said current valve N21. Transistor N22 works to enable or disable the battery charging process.

Said up/down counter COUNT1 can be preset, with the control inputs PRESET1, to a desired value as a starting point. And the oscillator OSC1 can be instructed, with the control signals F-CTRL1 to run at a variety of clock frequencies.

By varying the frequency of said oscillator OSC1, the ramp-up/ramp-down characteristics can be varied in a wide range, giving enormous flexibility on the timing characteristics of the circuit as disclosed in this invention.

The circuit also allows to switch the battery charging current off, when the supply voltage is below a specified minimum voltage USMIN. The circuit will switch on said battery charging current, when the supply voltage passes said specified minimum voltage again and said digital feedback loop will, even under this condition, reach the final stable point within one pulse of said pulsed power supply. In addition the circuit can be completely disabled with the enable control signal EN2.

The method to achieve the objectives of this invention is illustrated in FIG. 3. First, the circuit needs to generate a current reference in step 31. Then, when the charge current is enabled in step 32, the comparator will compare charge current with current reference in step 33. If the charge current is larger than the current reference (step 34), said up/down counter would step up in step 35. Said digital-to-analog-converter will then convert the counter's digital output value into an equivalent analog signal in step 37. The current valve will further open in step 39 and as result the charge current increases in step 41. Otherwise, if the charge current is smaller than the current reference (step 34), said up/down counter would step down in step 36. Said digital-to-analog-converter will then convert the counter's digital output value into an equivalent analog signal in step 38. The current valve will further open in step 40 and as result the charge current increases in step 42. At any time, when the regulator is not enabled in step 32, the oscillator is stopped and the up/down counter is halted in step 45, i.e. the counter is frozen at its last value. At the same time, the regulator current is switched off in step 46. As soon as the regulator is enabled in step 32, the regulator resumes from the last defined counter state in step 43. At the same time, the regulator current is switched on in step 44. As a result, the regulator needs no recovery time to resume from its previous enabled status.

While the invention has been particularly shown and described with reference to the preferred embodiments thereof, it will be understood by those skilled in the art that various changes in form and details may be made without departing from the spirit and scope of the invention.

What is claimed is:

1. A circuit for regulating the charge current with improved loop stability, comprising:
    means to provide the supply voltage to draw the charging current from;
    means to regulate a charging current, operating as an electric current valve;
    a shunt resistor to produce a voltage proportional to said charge current;
    means to build an adjustable voltage source, which, divided by said shunt resistor, represents the desired charge current;
    means to compare said voltage proportional to said charge current and said reference voltage proportional to said desired charge current, determining whether said charge current is, at a given time, above or below its desired value;
    means for an up/down counter that increases or decreases its counter value, depending on the above voltage comparisons result;
    an oscillator to step said up/down counter in a regular time interval;
    means to enable and disable said oscillator;
    means building a digital-to-analog-converter, converting the digital output value of said means for an up/down counter into an analog signal, which will control the current regulating element;
    means to control said current regulating element depending on the analog output current of said means building a digital-to-analog-converter
    means to enable or disable the current regulating element; and
    means to sense the minimum supply voltage, in order to control enable or disable the regulator operation.

2. The circuit of claim 1, wherein said means for an up/down counter works as a low-pass filter with a time-behavior determined by said oscillator's step repetition rate.

3. The circuit of claim 1, wherein said means for an up/down counter can run at various frequencies, in order to achieve a wide range of frequency response characteristics.

4. The circuit of claim 1, wherein said means for an up/down counter can be preset to a specific digital value, for example for initializing purposes.

5. The circuit of claim 1 wherein said oscillator, is a variable frequency oscillator.

6. The circuit of claim 1 wherein said oscillator means can vary its output frequency under control of external signals.

7. The circuit of claim 1 wherein said oscillator, is an integrated circuit oscillator.

8. The circuit of claim 1 wherein said means to regulate said battery charging current, operating as an electric current valve, is a transistor.

9. The circuit of claim 1 wherein said means to compare said voltage proportional to said charge current and said voltage proportional to said reference current, is an integrated circuit voltage comparator.

10. The circuit of claim 1 wherein said means to build an adjustable voltage source use a current reference and a resistor in series with the current source.

11. The circuit of claim 1 wherein said means to build an adjustable voltage source uses an integrated voltage reference source.

12. The circuit of claim 1 wherein said means building a digital-to-analog-converter is an IDAC (Current Digital to Analog Converter).

13. The circuit of claim 1 wherein said means for an up/down counter, is an integrated circuit up/down counter.

14. The circuit of claim 1 wherein said means to enable or disable the current regulating element either allows the output of said means, building a digital-to-analog-converter, to control said electric current valve for regulating said battery charging current or switches said electric current valve for regulating said battery charging current completely off.

15. The circuit of claim 1 wherein said means to sense the minimum supply voltage, in order to control enable or disable the regulator operation is built by a reference-voltage-circuit and a comparator.

16. The circuit of claim 1 wherein said means to enable and disable said oscillator is an arrangement of one or more transistors.

17. The circuit of claim 1 wherein said means to build an adjustable voltage source use a current reference and a resistor in series with the current source.

18. The circuit of claim 1 wherein said means to build an adjustable voltage source uses an integrated voltage reference source.

19. The circuit of claim 1 wherein most or all circuit elements are implemented on a single semiconductor chip.

20. The circuit of claim 1 wherein said power supply is a pulsed power supply, such as a rectified sine wave power supply without a large filter capacitor.

21. The circuit of claim 1 which provides a pulse-width-modulated battery charge current.

22. The circuit of claim 21 wherein the signal to control said pulse-width-modulated battery charge current is provided as an external signal.

23. A method for regulating the charge current with improved loop stability, comprising:
    providing means to regulate a charging current, operating as an electric current valve, a shunt resistor, where said charge current produces a voltage proportional to said charge current, means to build an adjustable voltage source, which, divided by said shunt resistor, represents the desired charge current, means to compare said voltage proportional to said charge current and said reference voltage, which is proportional to said desired charge current, means for an up/down counter, an oscillator to step said up/down counter in a regular time interval, means to enable and disable said oscillator, a digital-to-analog-converter, producing an output signal proportional to the up/down counter's digital value, which will then regulate said current valve and means to enable or disable said current valve;
    producing a voltage proportional to said charge current by means of the shunt resistor;
    producing a voltage reference to represent a reference for the desired charge current;
    comparing said voltage produced by said charge current and said reference voltage;
    stepping said means for an up/down counter with a signal from the oscillator;
    counting up when said voltage produced by said charge current is lower than said voltage produced by said reference current and counting down when said voltage produced by said charge current is higher than said voltage produced by said reference current;

converting the counter's digital output value into an equivalent analog signal;

feeding said analog signal, which is equivalent to said counter value, as a regulation signal to said current regulating element, which works as a current valve; and further opening said current regulating element when said regulation signal increases and further closing said current regulating element when said regulation signal decreases.

24. The method according to claim 23 wherein said stepping said means for an up/down counter is performed with a selectable frequency from said variable frequency oscillator.

25. The method according to claim 23 wherein said further opening or further closing said current regulating element is performed with various speeds, depending on the oscillator frequency selected.

26. The method according to claim 23 wherein said step of further opening or further closing said current regulating element is completely disabled by means of an enable/disable signal.

27. The method according to claim 23 wherein said step of further opening or further closing said current regulating element is disabled whenever the power supply voltage is below a specified minimum voltage by means of a voltage controlled enable signal.

28. The method according to claim 23 wherein said means of stepping said means for an up/down counter starts with a specific selectable value, preset by an external control function.

29. A method for a digital low-pass filter with improved timing characteristics and improved adjustability, comprising:

providing means for an up/down counter, an oscillator to step said up/down counter in a regular time interval, means to enable/disable said oscillator and means to set a specific frequency of said oscillator, a digital-to-analog-converter, finally producing an output signal proportional to said up/down counter's digital value;

setting said oscillator's frequency to one of a larger range of selectable frequencies;

stepping said up/down counter at various speeds with a signal from the oscillator, where the stepping speed varies with the selected frequency of said oscillator;

converting said up/down counter's digital output value into equivalent an analog signal; and ramping up or down the analog output signal, produced by said digital-to-analog-converter and depending on said up/down counter's stepping rate, thus providing a selectable timing characteristic.

30. The circuit of claim 29 wherein said oscillator, is a variable frequency oscillator.

31. The circuit of claim 29, wherein said means for an up/down counter works as a low-pass filter with a time-behavior determined by said oscillator's step repetition rate.

32. The circuit of claim 29, wherein said means for an up/down counter can run at various frequencies, in order to achieve a wide range of frequency response characteristics.

33. The circuit of claim 29 wherein said means to compare said voltage proportional to said charge current and said voltage proportional to said reference current, is a integrated circuit voltage comparator.

34. The circuit of claim 29 wherein said means building a digital-to-analog-converter is an IDAC (Current Digital to Analog Converter).

35. A method for regulating the charge current with improved loop stability and improved adjustability, comprising:

providing means to regulate a charging current, operating as an electric current valve, means to compare said charging current with a reference, which is proportional to the desired charge current, means for an up/down counter, means to preset said up/down counter to any number of values within the counter's range, an oscillator to step said up/down counter in a regular time interval, means to enable and disable said oscillator, a digital-to-analog-converter, producing an output signal proportional to the up/down counter's digital value, which will then regulate said current valve;

setting the up/down counter to a specific value in order to manipulate the regulator function through external commands, using a preset-interface to said up/down counter;

converting said up/down counter's digital output value into an equivalent analog signal; and feeding said analog signal, which is equivalent to said counter value, as a regulation signal to said current regulating element, thus providing improved adjustability of the charge current regulator function.

36. The circuit of claim 35, wherein said means for an up/down counter can be preset to a specific digital value, for example for initializing purposes.

37. The circuit of claim 35 wherein said means building a digital-to-analog-converter is an IDAC (Current Digital to Analog Converter).

38. The circuit of claim 35 wherein said means to regulate said battery charging current, operating as an electric current valve, is a transistor.

39. A method for freezing the regulator state, while the regulator is temporarily disabled, comprising:

providing means for an up/down counter, an oscillator to step said up/down counter in a regular time interval, means to enable/disable said oscillator, a digita-to-analog-converter, finally producing an output signal proportional to said up/down counter's digital value;

holding said up/down counter at its last value while the regulator is temporarily disabled;

converting said up/down counter's digital output value into equivalent an analog signal;

keeping the analog output signal, produced by said digital-to-analog-converter and depending on said up/down counter's state, thus keeping the analog regulator control signal at the last achieved value; and resuming said up/down counter from its last value as soon as the regulator is enabled again.

40. The method according to claim 37 wherein said holding said up/down counter at its last value is achieved by stopping the oscillator.

41. The method according to claim 37 wherein said holding said up/down counter at its last value is achieved by disabling the counter input from stepping with said oscillator signal.

42. A method for providing a pulse-width-modulated battery charge current, while maintaining stable current regulating characteristics, comprising:

providing means to regulate a charging current, operating as an electric current valve, means to compare said charging current with a reference, which is proportional to the desired charge current, means to completely disable said charging current, an oscillator to step an up/down counter in a regular time interval, means for said up/down counter, means to enable and disable counting of said up/down counter, a digital-to-analog-converter, producing an output signal proportional to the up/down counter's digital value, which would then regulate said current valve;

supplying an external pulse-width-modulated control signal to the regulator circuits enable input;

enabling the electric current valve when said pulse-width-modulated control signal defines the charging current to be on;

running said oscillator and stepping said up/down counter;

producing an output signal proportional to said up/down counter's digital value, which will then regulate said current valve;

disabling the electric current valve when said pulse-width-modulated control signal defines the charging current to be off;

freezing said up/down counter, thus keeping the last digital counter value;

producing an output signal proportional to said up/down counter's digital value, which would then regulate said current valve; and resuming said up/down counter operation and enabling said electric current valve when said pulse-width-modulated control signal defines the charging current to be on again.

43. The method according to claim 40 wherein said holding said up/down counter at its last value is achieved by stopping the oscillator.

44. The method according to claim 40 wherein said holding said up/down counter at its last value is achieved by disabling the counter input from stepping with said oscillator signal.

* * * * *